United States Patent [19]

Vance

[11] 3,730,573

[45] May 1, 1973

[54] SYSTEM FOR REGENERATIVE LOAD ABSORPTION

[75] Inventor: Alvin M. F. Vance, Williamsville, N.Y.

[73] Assignee: Westinghouse Electric Corporation, Pittsburgh, Pa.

[22] Filed: Feb. 7, 1972

[21] Appl. No.: 224,203

[52] U.S. Cl. .......................................290/17, 307/84

[51] Int. Cl. ................................................B60l 7/04

[58] Field of Search ..........................307/84; 322/97; 105/35, 49; 290/3, 17; 318/362, 376

[56] References Cited

UNITED STATES PATENTS

| | | | |
|---|---|---|---|
| 2,745,050 | 5/1956 | Johnson et al. | 290/3 X |
| 2,629,058 | 2/1953 | Lillguist | 105/35 X |
| 2,591,791 | 4/1952 | Dilworth | 290/17 X |
| 2,501,477 | 3/1950 | Pestarini | 290/17 |
| 2,304,895 | 12/1942 | Dilworth et al. | 290/17 X |

*Primary Examiner*—Robert K. Schaefer
*Assistant Examiner*—William J. Smith
*Attorney*—F. H. Henson et al.

[57] ABSTRACT

A system for regenerative load absorption is provided for an arrangement in which a prime mover drives a plurality of d.c. generators arranged on a common shaft, and cooperating to energize a plurality of d.c. motors. An a.c. generator is also coupled to the common shaft. A thyristor power amplifier is connected to the a.c. generator and to a dissipative load, the power amplifier transferring power from the a.c. generator to the dissipative load in response to trigger signals which are supplied from a gating amplifier. Regenerative sensing apparatus is coupled to the gating amplifier and to the d.c. generators-d.c. motors to provide signals of one polarity when the net d.c. generator power requirements are for motoring, and signals of another polarity when the net d.c. generator power requirements are for generating, the gating amplifier delivering the trigger signals to the thyristor power amplifier only upon receipt of signals of the one polarity during motoring.

4 Claims, 7 Drawing Figures

SYSTEM FOR REGENERATIVE LOAD ABSORPTION

BACKGROUND OF THE INVENTION

1. Field of the Invention

This invention relates to a system for regenerative load absorption.

2. Discussion of the Prior Art

In utilizing motor-generator sets, under dynamically changing load conditions, the functional roles are frequently interchanged so that the generator may be motoring. Where the prime mover's regenerative power absorption capability is large no problem exists. However, where the prime mover possesses less than the requisite absorption capability, some means must be devised to dissipate the unabsorbed regenerative power.

The problem is particularly acute in the drives used for excavating or dredging equipment, as for example, where the prime mover is a diesel engine coupled to d.c. generators. Since the diesel engine has poor capacity for absorbing regenerative power, in the order of 10–15 percent, some method must be used to absorb the remaining 85–90 percent or the diesel engine will be destroyed.

In the practice of the prior art, the advent of regeneration is sensed, and a dynamic breaking resistor is connected across the motor armature by means of d.c. contactors. Since it is desirable to maintain constant torque, the armature current should be kept constant. As the motor slows down, the voltage goes down and therefore, the resistance must be lowered in order to maintain the same current. This is accomplished by means of additional resistors arranged in parallel with the motor armature and connected into the motor armature circuit as the armature voltage falls. This technique has serious drawbacks. It is difficult to sense accurately the advent of regeneration as well as its demise—there is an inherent time lag. Additionally, there is a time lag caused by the closure and opening of the d.c. contactors. Since the regeneration cycle occurs frequently, the d.c. contacts are likewise opened and closed many times so that the threat of fatigue failure makes preventive maintenance a costly necessity. Finally, the control which is achieved is unsatisfactory since the successive introduction of the resistors into the motor armature is a step function disturbance. The instant invention obviates these disadvantages and provides smooth effective control.

SUMMARY OF THE INVENTION

In an arrangement wherein a prime mover drives a plurality of d.c. generators arranged on a common shaft, cooperating to energize a plurality of d.c. motors, a system is provided for dissipating the regenerating power resulting when the net requirements for said d.c. generators are for motoring. A.C. generator means are coupled to the common shaft. Thyristor power amplifier means are coupled to the a.c. generator means and to dissipative load means so as to be actuated in response to trigger signals to transfer power from said a.c. generator means to said dissipative load means. Gating means are coupled to the thyristor power amplifier means to deliver said trigger signals. Regenerative sensing means are coupled to said gating means and to said d.c. generators — d.c. motors for providing signals of one polarity when the net d.c. generator power requirements are for motoring, and signals of another polarity when the net d.c. generator power requirements are for generating, said gating means delivering said trigger signals only upon receipt of signals of said one polarity during motoring.

DESCRIPTION OF PREFERRED EMBODIMENT

Figure 6:
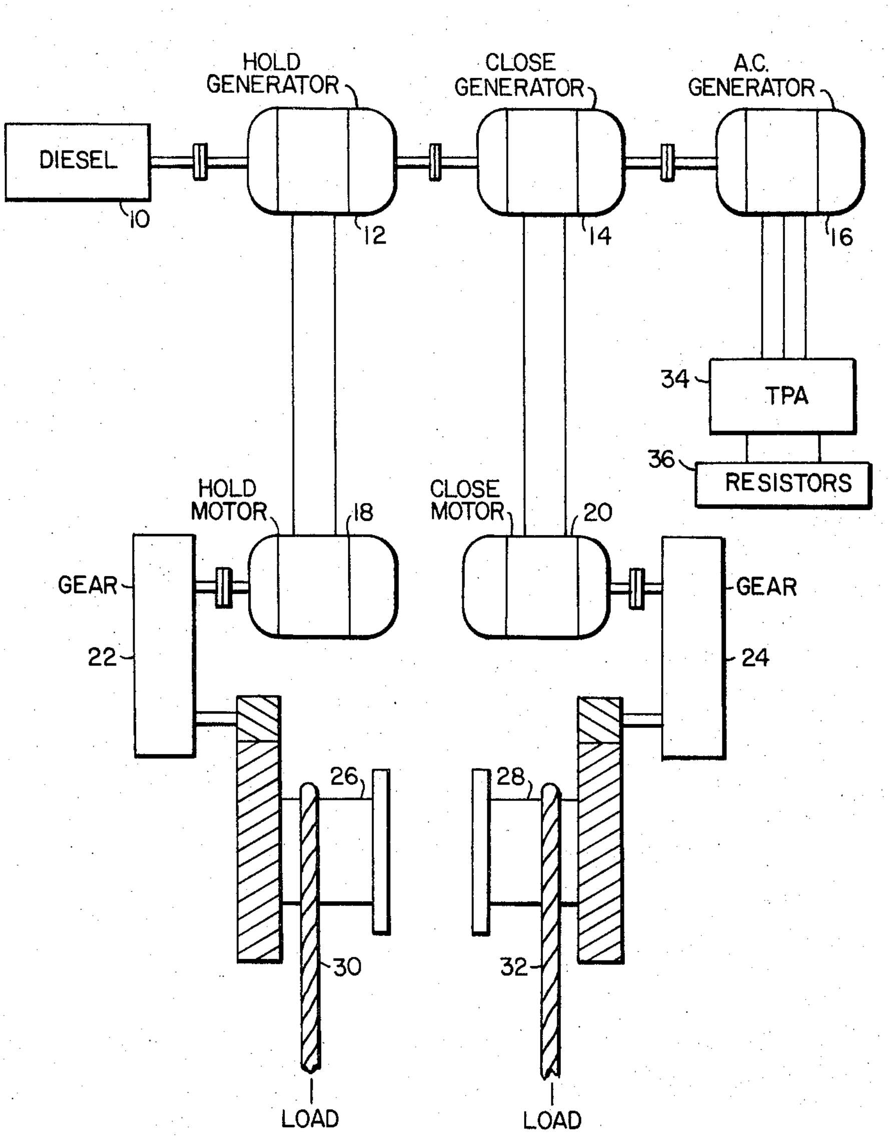
FIG. 6 is a diagram depicting the utilization of the system of the invention for dredging or excavating equipment.

Referring to FIG. 6, a prime mover, such as a diesel engine 10 for example is coupled to drive a hold generator 12, a close generator 14 and an a.c. generator 16. The hold generator 12 energizes a hold motor 18 and the close generator 14 energizes a close motor 20. The shaft of hold motor 18 is connected to a gear train indicated at 22 to rotate a drum 26 which carries a cable 30 to the hold load. Similarly, the shaft of close motor 20 is connected to a gear train indicated symbolically at 24 to rotate a drum 28 carrying a cable 32 to the close load.

When the hold and/or the close generators 12, 14 are motoring, the rotational displacement turns over the a.c. generator 16 which through a thyristor power amplifier 34 dissipates the additional regenerative energy as electric power in a dissipating resistor 36.

Figure 1:
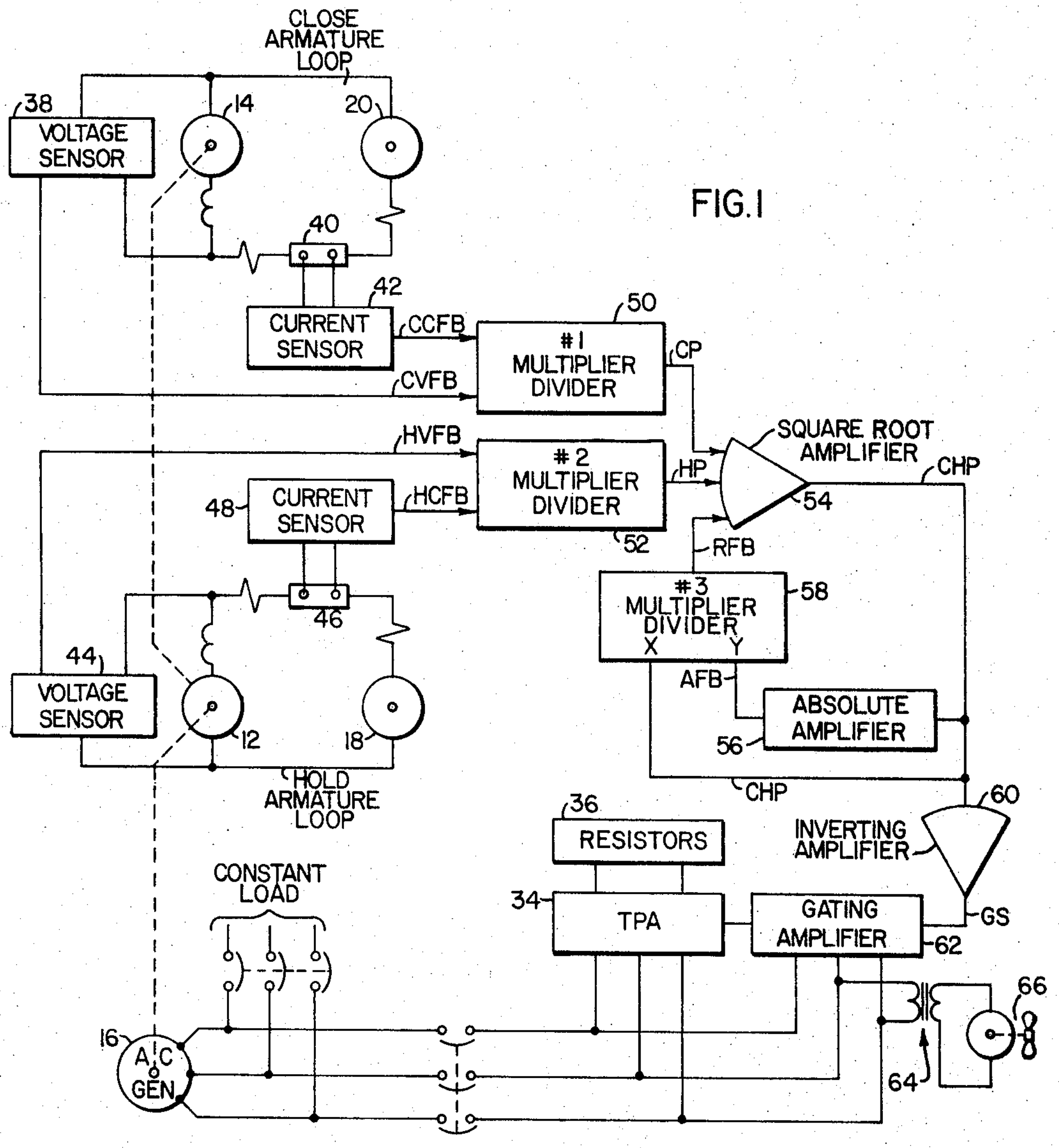
FIG. 1 is a block diagram of the system for regenerative load absorption.

The overall system in greater specificity is shown in FIG. 1. For the close motion, a voltage sensor 38 is connected across the terminals of close generator 14. A resistor 40, inserted in the close armature loop, is arranged in shunt with a current sensor 42.

Similarly, for the hold motion, a voltage sensor 44 is connected across the hold generator 12, and a resistor 46 inserted in the hold armature loop is arranged in shunt with a current sensor 48.

As shown in FIG. 1, the signals developed by the sensors 38, 42, 44 and 48 are identified as: CVFB, CCFB, HVFB, and HCFB respectively. These signals are abbreviations for the following:

CVFB = close voltage feedback

CCFB = close current feedback

HVFB = hold voltage feedback

HCFB = hold current feedback

The close feedbacks signals CVFB, CCFB are applied to a first multiplier-divider 50; the hold feedback signals HVFB, HCFB are applied to a second multiplier divider 52. The outputs of the multiplier dividers 50, 52 are appropriately designated CP and HP standing for close power and hold power respectively. These power signals CP and HP are applied to an amplifier 54 which delivers an output CHP (close-hold power). The CHP signal is applied to: an absolute amplifier 56; one input ($x$) of a third multiplier-divider 58, and to an inverting amplifier 60. The output of the absolute amplifier 56 i.e., A.F.B. (absolute feedback) is applied to the other input ($y$) of the multiplier-divider 58. The output of the multiplier-divider 58, identified as the resultant feedback (RFB), is applied to the amplifier 54. The inverted output of the amplifier 60 is a gating signal (GS) which is applied to a gating amplifier 62 which gates or fires the thyristor power amplifier 34.

Completing the description of FIG. 1, the a.c. generator 16 is a three-phase machine, and in addition to its cooperative role in regeneration load absorption, may be used to provide useful power to auxiliary loads. For example, one phase is connected to the primary transformer indicated generally at 64, the secondary of which is connected to energize a blower 66.

Figure 2:
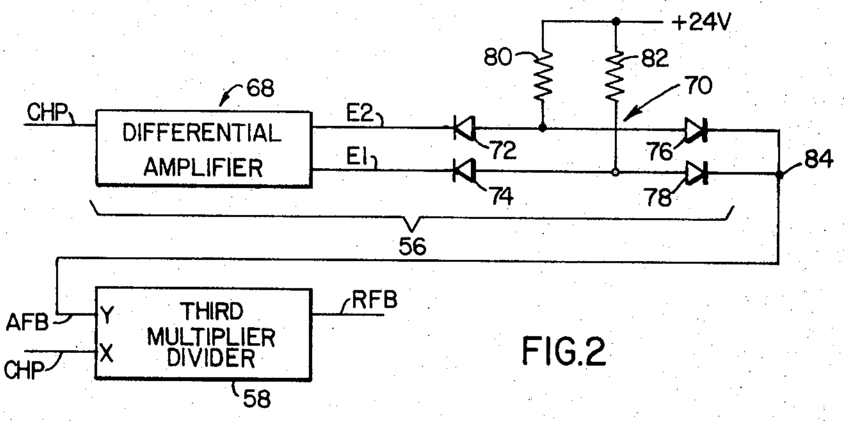
FIG. 2 is a block diagram of the absolute amplifier and the third multiplier divider used in the system of FIG. 1.

Referring now to FIG. 2, the absolute amplifier 56 comprises a differential amplifier indicated generally at 68, and a resistor-diode network indicated generally at 70. The resistor-diode network 70 comprises four diodes: 72, 74, 76, 78 and resistors 80, 82. The diodes 72, 74 have their cathodes connected to $E_2$ and $E_1$ respectively the outputs of the differential amplifier 68. The anodes of diodes 72, 74 are connected to the anodes of diodes 76 and 78 respectively. Resistor 80 is connected at one end to the anodes of diodes 72, 76 the other end being returned to a +24$v$ source; resistor 82 is connected at one end to the anodes of diodes 74, 78, the other end of which is connected to a +24$v$ source. The cathodes of diodes 76, 78 are connected in common to provide the AFB signal.

OPERATION

As indicated earlier, in excavating or dredging operations under normal dynamic conditions the roles of the generator-motor are interchanged, and some means must be provided to handle the regenerative power, when the generator operates as a motor, and drives the prime mover. When the prime mover is a diesel which possesses poor capability for absorbing regenerative power, the problem may be serious enough to destroy the diesel engine.

Figure 3:
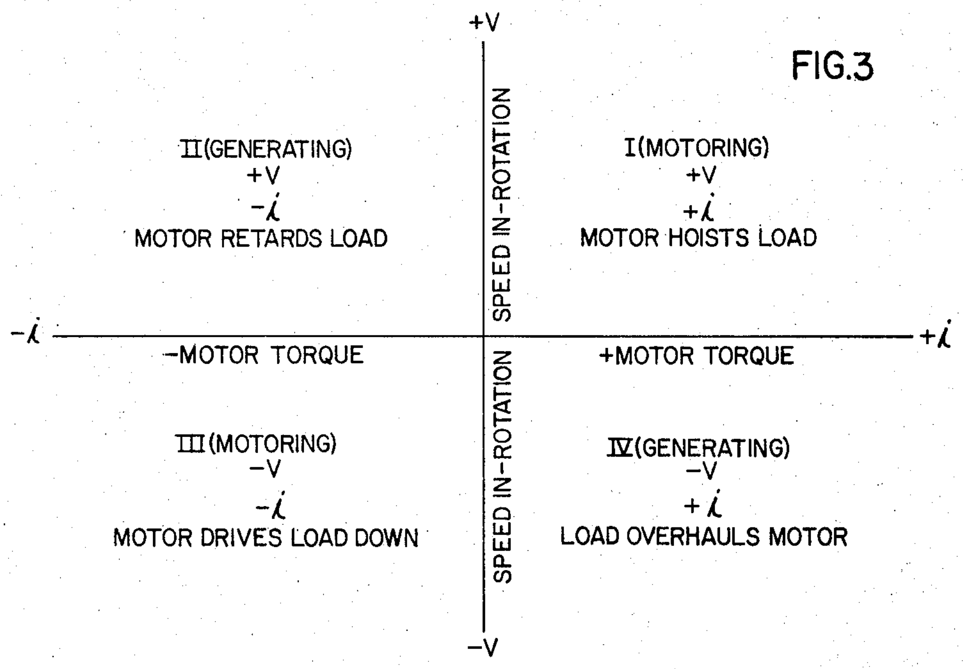
FIG. 3 is a diagram showing the four quadrants of motor performance.

As may be seen from a study of FIG. 3, during metering, i.e., quadrants I and III, the motor is hoisting a load down respectively. During generating, i.e., quadrants II and IV, the motor retards the load, and the load overhauls the motor respectively.

In one practical environment, the invention is used with dredging equipment for operating a clamshell bucket. Continuously during its operation, the motor operates in the II and IV quadrants, so that its associated generator acts as a motor driving its prime mover. As a practical matter, the motor passes rather quickly through the II quadrant so that the primary concern is IV quadrant operation. Additionally, since the clamshell bucket requires two motors—close and hold—one motor may be motoring when the other is generating. The instant system is intended to operate only during II and IV quadrant operation, and additionally, to respond to the situation where one motion motor is generating quadrants II and IV, while the other motion motor is motoring, i.e., quadrants I or III. Obviously, the system must be unresponsive where both motion motors are operating in quadrants I and III.

Assume operation with both close and hold motors in quadrant I. As may be seen in FIG. 3, the voltage is + and the current is +.

Figure 4:
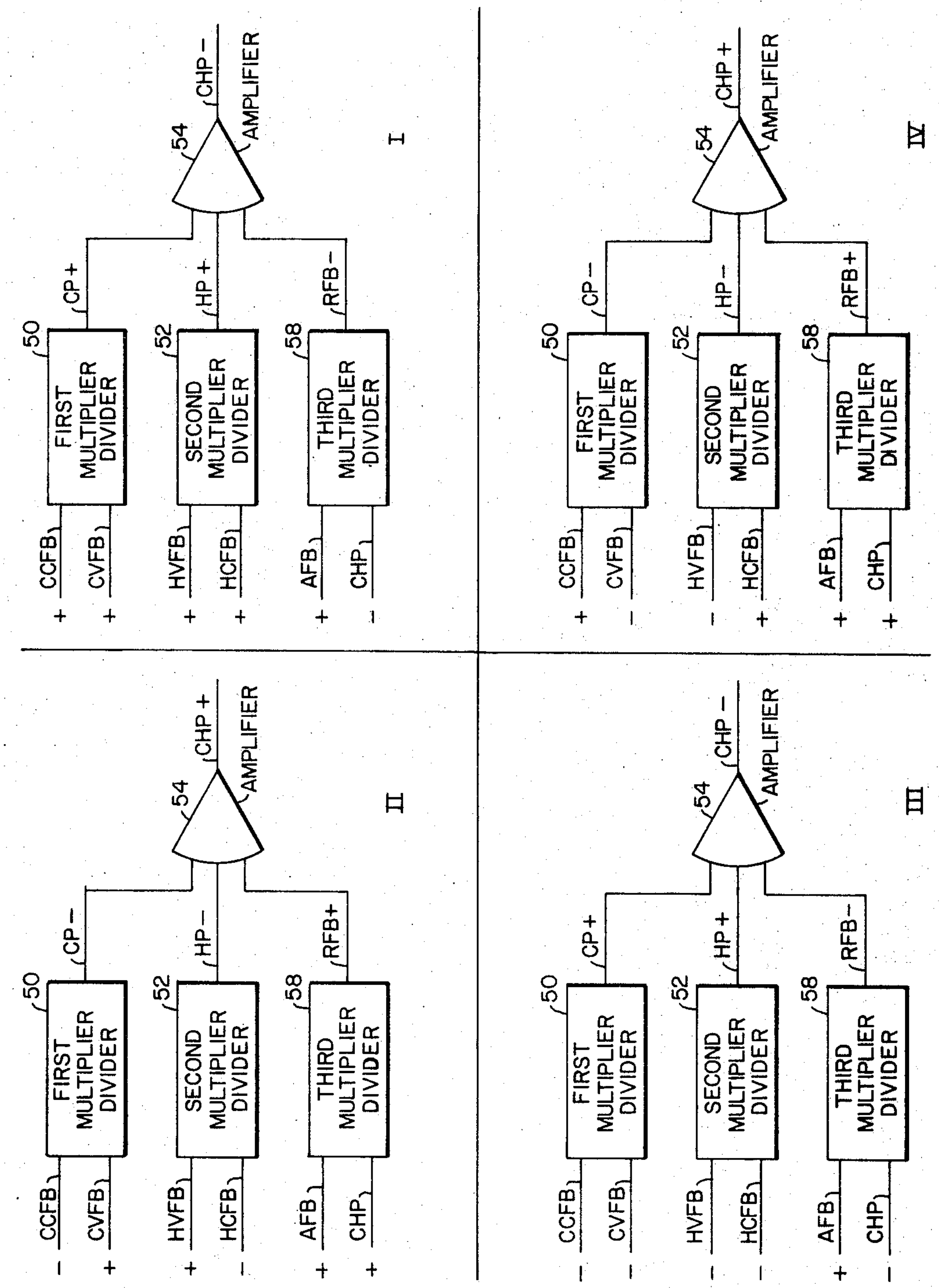
FIG. 4 is a diagram showing the various signal polarities for the system of the invention operating in the four quadrants of motor performance.

Referring now to FIG. 4, CCFB, CVFB, HVFB and HCFB are all +. The signals are all d.c. so that the multiplication of voltage and current equals power. Thus, the first and second multipliers 50, 52 provide positive power CP and HP respectively. (The divider portion of 50, 52 divides by 10 and provides a signal of lower magnitude for control purposes.) The amplifier 54 performs a summation, and provides an output signal CHP which is a function of the close and hold power. This signal as shown in FIG. 4 is of negative polarity.

The signal CHP is applied to the differential amplifier 68 (FIG. 2) which produces two signals $E_2$ and $E_1$ which are equal in magnitude but opposite in polarity; the magnitude of ($E_2$) ($E_1$) depends upon the input signals CP and HP. With the signals $E_2$, $E_1$ of opposite polarity, either the diode 72 or diode 74 will be forward biased for conduction. The resistor-diode network 70 passes current through resistors 80, 82 only in positive direction (conventional direction + to −) so that node 84 is always positive with respect to ground. The magnitude of the voltage at node 84 depends upon the magnitude of the voltages ($E_2$) ($E_1$) and will always be positive with respect to ground. AFB therefore is always a positive signal regardless of the quadrant of motor operation.

With CHP− and AFB+ (FIG. 4: quadrant I) the feedback signal RFB to the amplifier 54 is −. The CHP signal to amplifier 60 is inverted so that a GS (+) retards the gating angle of the thyristor amplifier 34 and therefore no load absorbing power will be applied to resistor 36.

During II or IV quadrant motor operation (see FIGS. 3 and 4) the voltage is + and − respectively. The CP and HP are therefore both negative. The output CHP of the amplifier 54 is positive, and the output RFB of the third multiplier 58 is positive (since its two inputs are positive, i.e., + X + = +). The +CHP to amplifer 60 is inverted to a GS− which controls the gating amplifiers 62 to gate the thyristor power amplifier 34; when the thyristor power amplifier 34 is gated, there is a power flow from the AC generator 16 which is absorbed by the load resistors 36. On regeneration therefore, instead of the generators 12 and 14 overspeeding the diesel engine 10, the shaft torque drives the AC generator 16 and regenerating power is absorbed by the resistors 36.

As the output volage of the thyristor power amplifier doubles, the output current also doubles with the result that four times the power would have to be absorbed by the resistors 36. Therefore in order to limit the power absorbed so that it is proportional to the d.c. generator output, a square root reference signal GS into the gating amplifier 62 is used to control the gating of the thyristor power amplifier 34 into the load resistors.

The output of the amplifier 54 is:

$$CHP = \sqrt{CP + HP}$$

The signal RFB is:

$$RFB = (CHP)^2$$

And the gating signal GS is:

$$GS = -CHP = -\sqrt{CP + HP}$$

Thus, if CP and HP doubles, one does not want to dissipate four times as much power in resistors 36 but only twice as much power. Therefore the gating signal is:

$$GS = -(\sqrt{CP + HP}) = -(\sqrt{2+2}) = -2$$

Figure 5A:
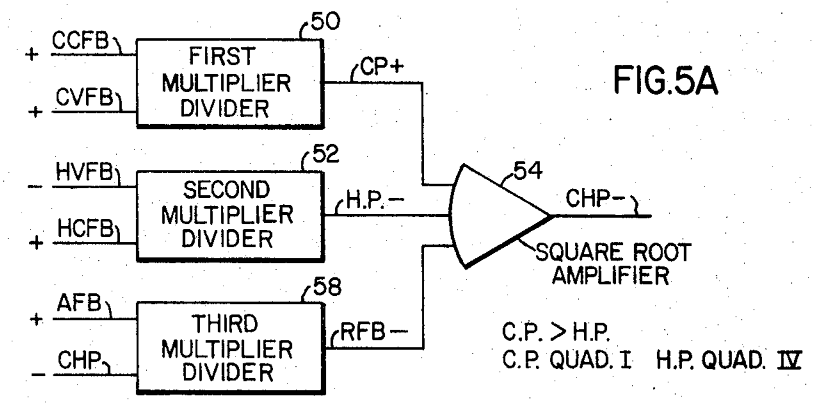
FIGS. 5A and 5B are schematic diagrams used in explaining the operation of the system.

The discussion so far has assumed that both close and hold motion motors are operating in the same quadrant. The respective motors can however be operating in different quadrants wherein one generator is acting as a generator and the other generator is motoring. For example, the close motion motor may be operating in quadrant I, while the hold motor is operating in quadrant IV. Referring now to FIG. 5A assume first that CP>HP. In that case CP is + and HP is −. The square root amplifier responds to the square root of the algebraic sum of the two signals CP, HP, and the result is inverted to give the signal CHP−. The inverting amplifier 60 inverts this signal so that GS is + and therefore there is no response from the thyristor power amplifier 34. This is the result which is desired since by virtue of the power levels CP>HP overall operation is predominantly in quadrant I.

Figure 5B:
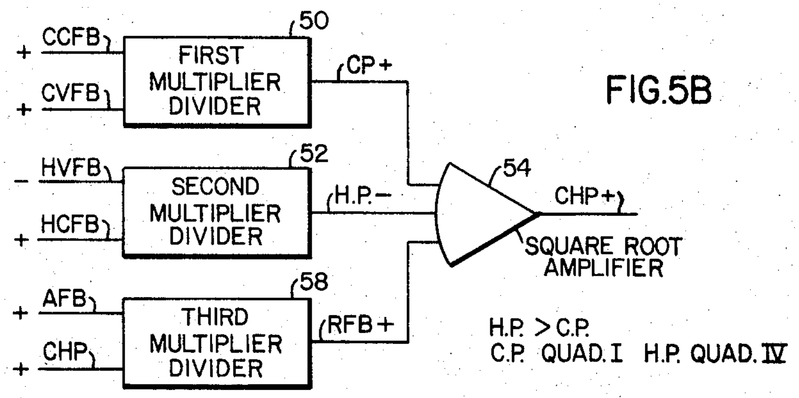

In FIG. 5B, close and hold motion motors are still operating in quadrants I and IV respectively, but the demand for hold motion power is greater i.e., HP>CP. Again the amplifier 54 responds to the square root of the algebraic sum of −HP+CP and the resultant signal after inversion is +CHP. The inverting amplifier 60 inverts the signal producing −GS to gate on the thyristor power amplifier 34 and the regeneration power is dissipated in resistors 36.

The only remaining case to consider is where CP=HP, i.e., the demands for close power in quadrant I equals the demand for hold power in quadrant IV. The algebraic sum of these signals is zero, and CHP is therefore zero—the status quo remains unchanged. The hold motion generator, running as a motor, now acts as a prime mover and drives the close motion generator, the diesel engine 10 merely idling along.

I claim:

1. In an arrangement wherein a prime mover drives a plurality of d.c. generators arranged on a common shaft cooperating to energize a plurality of d.c. motors, a system for dissipating the regenerating power resulting when the net power requirements for said d.c. generators are for motoring;

a. a.c. generator means coupled to said common shaft;

b. dissipative load means;

c. thyristor power amplifier means coupled to said a.c. generator means and to said dissipative load means, actuated in response to trigger signals, to transfer power from said a.c. generator means to said dissipative load means;

d. gating means coupled to said thyristor power amplifier means to deliver said trigger signals;

e. regenerating sensing means coupled to said gating means and to said d.c. generators and said d.c. motors, for providing signals of one polarity when the net d.c. generator power requirements are for motoring, and signals of another polarity when the net d.c. generator power requirements are for generating, said gating means delivering said trigger signals only upon receipt of signals of said one polarity during motoring.

2. A system according to claim 1 wherein said regenerating sensing means comprises amplifying means, multiplier means, absolute amplifying means, and inverting amplifier means, said amplifying means having an input for receiving power control signals, one for each of said d.c. generators, which are of one polarity when the respective d.c. generator is motoring, and of opposite polarity when the respective d.c. generator is generating, the output of said amplifying means being a composite power signal which is a function of the motoring-generating requirements, said composite power signal being applied to the input of said absolute amplifier means, to said inverting amplifier means, and to a first input of said multiplier means, a second input of said multiplier means being connected to receive the output of said absolute amplifier means, the output of said multiplying means being a resultant feedback signal which is applied to the input of said amplifying means, the output of said inverting amplifying means being connected to said gating means.

3. A system according to claim 2 wherein said amplifying means is a square root amplifier.

4. A system according to claim 2 wherein said absolute amplifying means comprises differential amplifier means connected to the output of said amplifying means, and dual outputs which are equal in magnitude, but opposite in sign, a diode-resistive network connected to said dual outputs, said diode-resistive network having a single output which is applied to said second input of said multiplier means, said single output being always of the same polarity, but varying in magnitude.

* * * * *